United States Patent [19]

Liu

[11] Patent Number: 5,764,774
[45] Date of Patent: Jun. 9, 1998

[54] SOURCE DATA COMPRESSION AND DECOMPRESSION IN CODE SYMBOL PRINTING AND DECODING

[75] Inventor: Larry Lingnan Liu, Mill Creek, Wash.

[73] Assignee: Intermec Corporation, Everett, Wash.

[21] Appl. No.: 533,113

[22] Filed: Sep. 25, 1995

[51] Int. Cl.$^6$ ............................................. H04L 9/00
[52] U.S. Cl. ............................................. 380/49; 380/9
[58] Field of Search ............................................. 380/9, 49

[56] References Cited

U.S. PATENT DOCUMENTS

| | | | |
|---|---|---|---|
| 5,029,107 | 7/1991 | Lee | 364/518 |
| 5,380,993 | 1/1995 | Komai | 235/462 |
| 5,388,158 | 2/1995 | Berson | 380/23 |
| 5,452,356 | 9/1995 | Albert | 380/9 |
| 5,563,946 | 10/1996 | Cooper et al. | 380/4 |

OTHER PUBLICATIONS

PDF417–Global Label Identifier–GLI900, Nov. 1994, submitted to AIM USA by Symbol Technologies, Inc., as a future Appendix to the PDF417 USS, pp. 2–15.

Primary Examiner—Thomas H. Tarcza
Assistant Examiner—Carmen D. White
Attorney, Agent, or Firm—Graham & James LLP

[57] ABSTRACT

A coded symbol encoding and decoding system and method provides improved efficiency and security by compressing and/or encrypting data prior to encoding the data into a coded symbol symbology. Prior to encoding the data into the coded symbol symbology, the encoding portion of the system compresses and/or encrypts the data. If compression decreases the size of the data by a given threshold, the system encodes the compressed data. Otherwise, the system encodes the uncompressed data. An unused character in the encoded data is used as a flag to indicate whether the data was compressed and/or encrypted. The encoded data is then printed as a coded symbol pattern. Conversely, the decoding portion reads the printed pattern, decodes the resulting data, and if necessary, decompresses and/or decrypts the data. Use of an unused character in the encoded data to indicate whether the data was compressed and/or encrypted allows the system and method to be used with existing symbologies. Separating the compression and the encodation processes allows the system and method to adapt to advances in compression and encodation techniques.

31 Claims, 6 Drawing Sheets

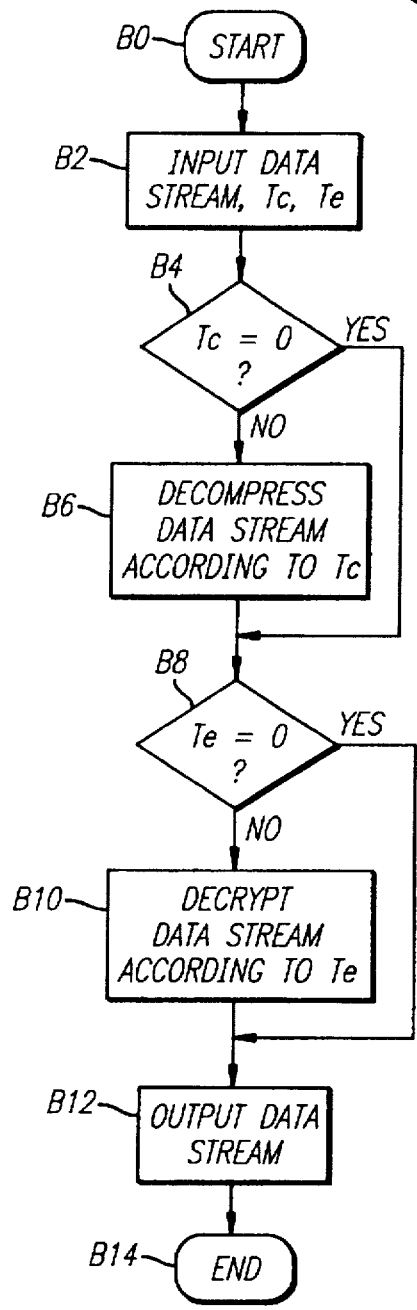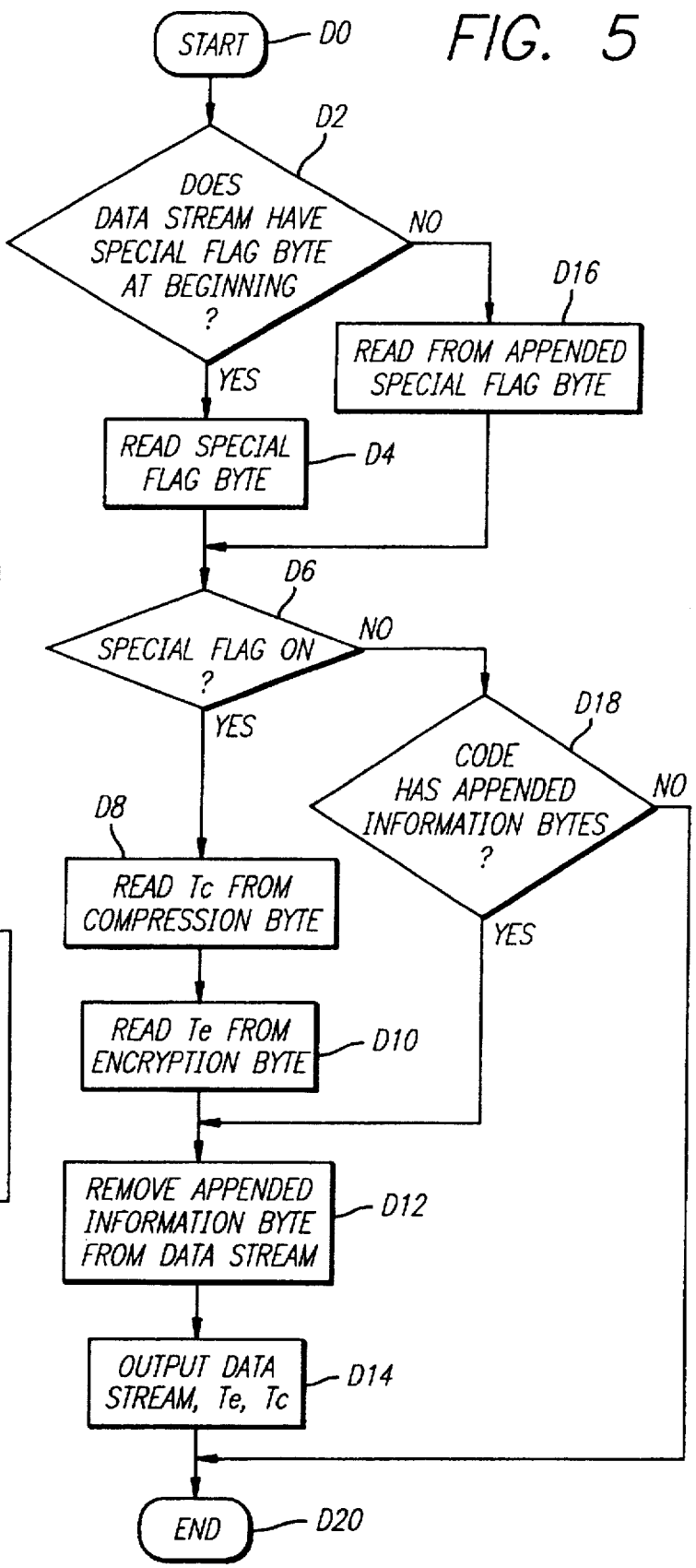

SOURCE DATA COMPRESSION AND DECOMPRESSION IN CODE SYMBOL PRINTING AND DECODING

BACKGROUND OF THE INVENTION

1. Field of the Invention

The present invention relates to a coded symbol encoding and decoding system for creating and reading one-dimensional and two-dimensional coded symbol patterns. More particularly, the present invention relates to a method and apparatus for compressing and/or encrypting data, encoding the data to represent a coded symbol pattern, and subsequently, reading, decoding, and decompressing and/or decrypting the data.

2. Description of Related Art

It is common within the automatic data collection industry to encode data conveying information about an object into a coded symbol pattern. The coded symbol pattern is printed on a label, and the label is attached to the object. Alternatively, the coded symbol pattern can be printed directly onto the object. An electro-optical imaging system can then be used to read the coded symbol pattern and translate it back into the original data. Systems of this nature are commonly used in various applications, such as inventory control, point of sale identification, or logistical tracking systems.

The data is encoded into the coded symbol pattern in accordance with a given symbology. Symbology refers to the rules that define the way data is encoded into a printed pattern. Traditionally, the automatic data collection industry has used only one-dimensional symbologies. A one-dimensional symbology defines a one-dimensional pattern of symbols. A bar code is an example of a one-dimensional symbology, and comprises a parallel arrangement of varying width bars and spaces. Numerous well known one-dimensional bar code symbologies exist, including Codabar, Code 39, and Code 93. FIGS. 6a–c show exemplary bar codes created using those respective symbologies.

Recently, the automatic data collection industry has begun to use two-dimensional symbologies. A two-dimensional symbology defines a two-dimensional pattern of symbols, and is generally capable of representing more data than a one-dimensional symbology. Numerous well known two-dimensional symbologies exist including Codablock, PDF417, Code One, Maxicode, Vericode, and Data Matrix. FIGS. 6d–i show exemplary two-dimensional symbol patterns created using those respective symbologies. The term coded symbol, as used herein, includes both one-dimensional and two-dimensional symbologies.

The physical size of the printed code symbol is directly related to the amount of data in the data source that is encoded into the printed code symbol. The size of the printed code symbol can therefore be reduced by reducing the size of the data source prior to encoding the data. With the advent of two-dimensional symbologies, the trend in the industry has been to encode increasingly larger amounts of data into a coded symbol pattern. It has therefore become increasingly important to reduce the size of the data before encoding it in order to control the size of the printed code symbol.

Data compaction is a technique for reducing the size of a data set by using shorter code words to represent the data than were used in the original data set. Data compaction works, however, only if the code words are larger than is necessary to represent all the data in the data set. If that is the case, data compaction reduces the size of the code words to a size that is minimally necessary to represent all the data in the data set. For example, if it is known that a data file contains eight-bit bytes representing ASCII code words, data compaction could be used to reduce the size of the data file by replacing each ASCII code word with a smaller code word. As is known, ASCII code contains 128 elements. Because seven bits are sufficient to represent 128 elements, data compaction could be used to reduce the size of the data file by replacing the eight-bit ASCII code words with seven-bit code words.

Data compaction has been used in the automatic data collection industry to reduce the size of a data set before encoding the data. For example, U.S. Pat. No. 5,380,993 to Komai discloses a system that uses a data compaction algorithm to reduce the number of digits used to represent data prior to encoding the data into a micro-bar code, and thereby reduce the physical size of the resulting micro-bar code.

A significant drawback to automatic data collection systems that use data compaction to reduce the size of data, such as Komai, is that data compaction can be used only if the type of data in the data set to be compressed is known ahead of time. This is because the size of the code words used to represent the data cannot be reduced unless it is known that the code words are larger than necessary to represent all the data in the data set.

Another significant drawback to automatic data collection systems that use data compaction is that data compaction does not take advantage of the inherent redundancy in most data sets. Such systems therefore do not achieve the size reduction that could be achieved by taking advantage of the redundancy.

Data compression is another data reduction technique, and it does not suffer from the above mentioned disadvantages of data compaction. More specifically, data compression reduces the size of a data set by taking advantage of the redundancy inherent in most data sets. Data compression can therefore be used even when the type of data to be compressed is not known ahead of time, and data compression often achieves results that are far superior to results achieved using data compaction. Several well known data compression techniques exist including statistical compression, run length compression, and substitutional compression.

Traditionally, data compression has been used in the data storage field to reduce the size of data prior to storing the data in a memory so that the data occupies a smaller area of the memory. Data compression has also been commonly used in the communications field to reduce the size of data prior to transmitting the data over a communications system. Despite its popularity of usage within the data storage and communications fields, however, data compression has not been used in the automatic data collection industry. This may be partly due to the fact that, in the automatic data collection industry, the total amount of data encoded into a single coded symbol pattern has traditionally been small. With the advent of two-dimensional symbologies, the trend in the industry has been to encode increasingly larger amounts of data into a coded symbol pattern. Because the potential advantages of using data compression increase as the size of the data to be compressed increases, compressing data prior to encoding it into a coded symbol has become increasingly advantageous.

A drawback with data compression is that it does not always result in a smaller data size. In fact, data compression, can in some cases, actually increase the size of the data being compressed because data compression necessarily generates overhead data. If the amount of overhead data generated is greater than the reduction in the original data, the net effect of the compression is to increase the size of the data. This is most likely to occur when the size of the original data is small to moderate. Because the amount of data used to identify objects with coded symbol patterns is often small to moderate, this problem could be particularly acute in a coded symbol encoding and decoding system that uses data compression.

Another significant drawback to traditional automatic data collection systems unrelated to data size reduction techniques is a lack of security. Traditional systems provide no protection against unauthorized use of the data encoded into a coded symbol pattern. Anyone with an electro-optical reader can access and use the data. Therefore, secret or sensitive data cannot safely be encoded into a coded symbol.

Accordingly, a critical need exists for a coded symbol encoding and decoding system that uses data compression to reduce the size of data that is to be encoded into a printed symbology. More specifically, a critical need exists for a system that uses data compression only if such compression results in a smaller data size. Such a system should be able to adapt to advances in data compression and symbology encoding techniques. Finally, a critical need also exists for a coded symbol encoding and decoding system that provides security against unauthorized use of the encoded data.

SUMMARY OF THE INVENTION

In accordance with the teachings of the present invention, a coded symbol encoding and decoding system provides data compression to reduce the size of a coded symbol. By separating the data compression process and the data encoding process, the system is able to easily adapt to advances in both data compression and data encoding techniques. The system also uses data encryption to prevent unauthorized use of the encoded data.

The system comprises two principal parts: an encoding portion and a decoding portion. The encoding portion is comprised of a source coding control, an input control, a data encoder, and a printer. The source coding control receives data from a data source, and controls compression and/or encryption of the received data. The input control appends information to an encoded data stream indicating whether the data stream was compressed and/or encrypted, and if so, the type of compression and/or encryption. The information is appended to the encoded data stream in such a way as to utilize existing symbology codes without the need to create a new code. The data encoder encodes the data stream into data representing a coded symbol using a given symbology. Finally, the printer prints the resulting coded symbol.

The decoding portion of the present invention reads the coded symbol printed by the printer, decodes the data, and displays the data. The decoding portion of the present invention is comprised of a code reader, an interface control, a source decoding control, a data decoder, and a display device. The code reader reads the coded symbol printed by the printer. The interface control determines whether the data read by the code reader contains compression and/or encryption data. The source decoding control decompresses and/or decrypts the data. The data decoder decodes the coded symbol data. Finally, the display device displays the decoded data.

A more complete understanding of the coded symbol encoding and decoding system will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 3 illustrates the operation of the source decoding control;

FIG. 5 illustrates the operation of the interface control;

DETAILED DESCRIPTION OF THE PREFERRED EMBODIMENT

The present invention satisfies the critical need for a system that uses compression to compress data prior to encoding the data into a coded symbol pattern. The present system also satisfies the need for a system that employs data encryption to prevent unauthorized use of the data. In the detailed description that follows, like element numerals are used to describe like elements in one or more figures.

The system of the present invention encodes source data into a coded symbol pattern. Prior to encoding, the system may compress and/or encrypt the source data. The coded symbol pattern may be a one-dimensional pattern, such as the exemplary bar codes of FIGS. 6a–c, or the coded symbol pattern may be a two-dimensional pattern, such as the exemplary patterns of FIGS. 6d–i.

Figure 6A:
FIGS. 6a–i illustrate exemplary coded symbol patterns.
Figure 6B:
Figure 6C:

FIGS. 6a–c show exemplary bar codes produced using the Codabar, Code 39, and Code 93 symbologies respectively. As can be seen, each bar code comprises a pattern of parallel bar and space elements of varying widths, and with a uniform height. As known in the art, the widths of the bar and space elements can be modulated to encode source data, which can be decoded by use of the decoding portion of the present invention. FIGS. 6d–i show exemplary two-dimensional coded symbol patterns produced using the Codablock, PDF417, Code One, Maxicode, Vericode, and Data Matrix symbologies respectively. As can be seen, each coded symbol pattern comprises a two-dimensional pattern of printed symbols. As known in the art, the size, spacing, etc. of the symbols in the pattern encode data, which can be decoded by use of the decoding portion of the present invention.

Figure 1:
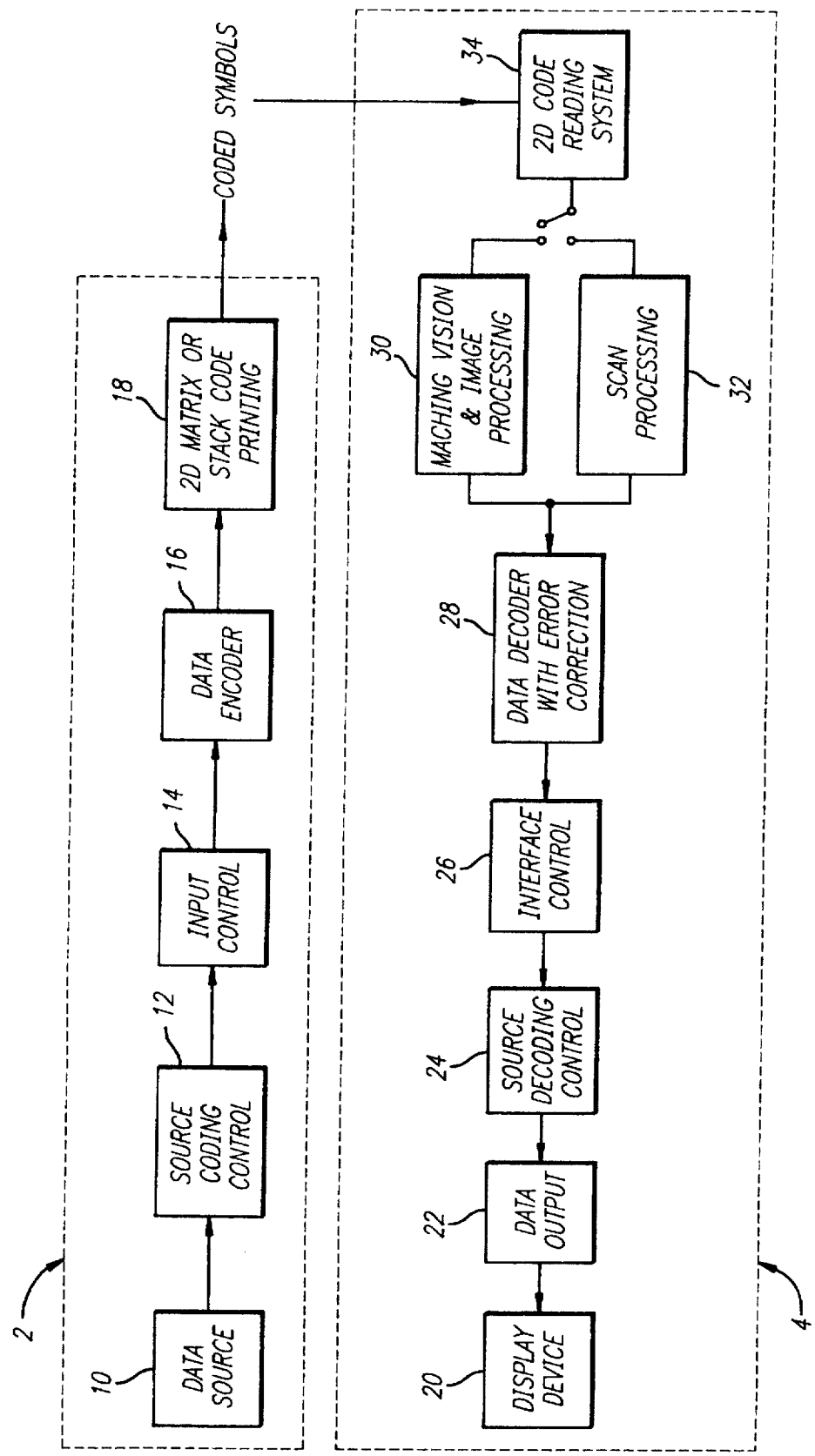
FIG. 1 is a block diagram of a coded symbol encoding and decoding system of the present invention.

Referring now to FIG. 1, a block diagram of a coded symbol encoding and decoding system is illustrated that includes the teachings of the present invention. The system comprises two principal parts: an encoding portion 2 and a decoding portion 4. The encoding portion comprises a source coding control 12, an input control 14, a data encoder 16, and a printer 18. The decoding portion comprises a code reader 34, a data decoder 28, an interface control 26, a source decoding control 24, and a display device 20.

The encoding portion 2 may be contained in a unit that is separate from the decoding portion 4. Also, the elements of each portion may be distributed, such as with the code reader 34 disposed in a remote device and the other elements of the decoding portion 4 disposed in a central unit.

The system may further comprise one or more microprocessors (not shown) that control the operation of the system. One or more program memories (not shown) coupled to the microprocessor contain instruction sets, i.e., software that is executed in a sequential manner by the microprocessor. The software defines the operation of the system, and in particular, defines the steps required to control the compression, encryption, and/or encoding of source data, and the subsequent decoding, decryption, and decompression of the data generated by the code reader 34. Software may also perform other related functions.

As is known in the art, the program memory (not shown) may be provided by conventional semiconductor-based read only memory (ROM) devices. Such ROM devices are non-volatile, and permit the stored instructions to remain in storage within the devices even after electrical power is removed. It should be apparent that the functions performed by the stored program may also be accomplished by traditional hardwired logic circuits or by a combination of hardwired logic circuits and software. However, software systems are preferred due to their relative simplicity, adaptability to change, and low cost. It should be apparent that the ROM devices may further be erasable or programmable, so that modifications or revisions to the software can be implemented as desired. Moreover, other types of permanent storage media can be utilized as the program memory, such as computer discs.

Figure 2:
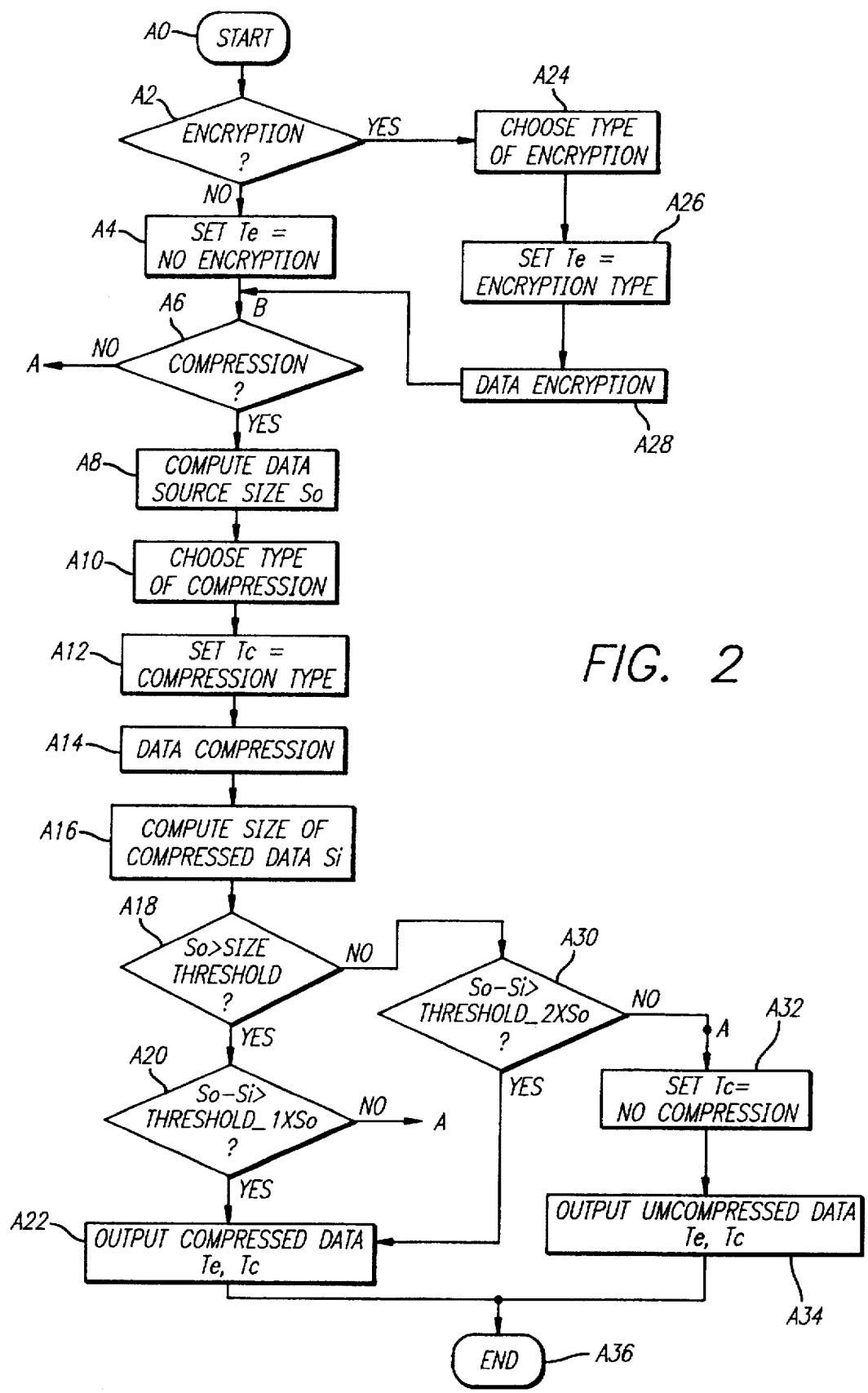
FIG. 2 illustrates the operation of the source coding control.

The operation of the system will now be described with reference to FIGS. 2 to 7. Referring first to FIG. 2, the operation of the source coding control 12 is shown. The source coding control 12 first receives source data from a data source. Typically, the source data identifies an object and conveys information about the object. For example, the source data may represent a part number, serial number, transaction code, or some other type of data. Alternatively, the source data may identify and/or convey information about something other than an object, such as a person. The source data can be received from the user or an external system or retrieved from a data storage device.

The source coding control 12 then determines whether the source data is to be encrypted at step A2, and if so, determines the type of encryption to be used. That determination may be based on data received from outside the system, such as data received from the user or another system, or may be based on data stored within the system. If the source coding control 12 determines that encryption is to be used, it chooses the appropriate type of encryption at step A24, sets an encryption indicator $T_e$ indicating the type of encryption at step A26, and encrypts the source data at step A28. If it determines that encryption is not to be used, it sets the encryption indicator $T_e$ to indicate that no encryption was used at step A4.

The source coding control 12 next determines whether the source data is to be compressed at step A6. That determination may be based on data received from outside the system, such as data received from the user or another system, or may be based on data stored within the system. If the system determines that the source data is not to be compressed, it sets a compression indicator $T_c$ indicating no compression at step A32, and outputs the source data, the compression indicator Tc, and the encryption indicator $T_e$ at step A34.

If the source coding control determines that the source data is to be compressed, it computes the size of the source data ($S_O$) at step A8. The source coding control then determines the type of data compression to use at step A10. That determination may be based on data received from outside the system, such as data received from the user or another system, or may be based on data stored within the system. It then sets the compression indicator Tc to indicate the type of compression at step A12 and compresses the source data at step A14.

Several well known data compression techniques exist including statistical compression techniques, run length compression techniques, and substitutional compression techniques. In a statistical compression approach, data elements in a given data set are assigned new code words. Shorter code words are assigned to data elements that are statistically more likely to appear in a given set of data. For example, a statistical compression technique for compressing a data file-containing English words might assign the letter "a" a shorter code word than the letter "x" because the letter "a" is likely to appear more frequently than the letter "x". Huffman coding is a commonly used statistical compression technique.

In a run-length compression approach, the number of sequentially repeated source elements in a given data set is counted, and then each occurrence of the element except for the first is removed and replaced with the number of occurrences. For example, a run-length compression technique for compressing a data file that includes 100 sequential "blank" characters would replace the 100 "blank" characters with one "blank" character and the number "100".

In a substitutional compression approach, all occurrences of a data element following the first occurrence are replaced with pointers to the first occurrence of the element. For example, a substitutional compression technique used to compress an employee data file would replace all occurrences of the employee's name subsequent to the first occurrence with a pointer to the first occurrence.

After compressing the source data at step A14, the source coding control 12 computes the size of the compressed source data ($S_1$) at step A16. The source coding control 12 then determines the amount by which the compression decreased the size of the source data. It does so by subtracting the size of the compressed source data ($S_1$) from the size of the uncompressed source data ($S_O$). The source coding control 12 then determines whether the compression decreased the size of the source data by more than a given threshold $T_h$ value at step A20 or A30. If so, the source coding control 12 outputs the compressed source data, the compression indicator $T_c$, and the encryption indicator $T_e$ at step A22. If the compression did not decrease the size of the source data by more than the given threshold $T_h$, the source coding control 12 sets the compression indicator $T_c$ to indicate that there was no compression at step A32 and outputs the uncompressed source data, the encryption indicator $T_e$, and the compression indicator $T_c$ at step A34. The threshold $T_h$ may be any suitable value including zero. In addition, as shown in FIG. 2, the source coding control 12 may employ more than one threshold value. The source coding control 12 could then select a particular threshold value based on the size of the uncompressed data stream, as shown in steps A18, A20, A30.

The input control 14 appends information to encoded data produced by the data encoder 16 indicating whether the source data was compressed and/or encrypted by the source coding control 12, and if so, the type of compression and/or encryption used. The appended information may include one or more of the following: a flag, compression data, and encryption data. The flag is used to indicate the presence or absence of compression data and/or encryption data in the encoded data. The compression data indicates the type of compression used to compress the source data, and the encryption data indicates the type of encryption used to encrypt the source data. The operation of the input control 14 is shown in FIG. 4.

Figure 4:
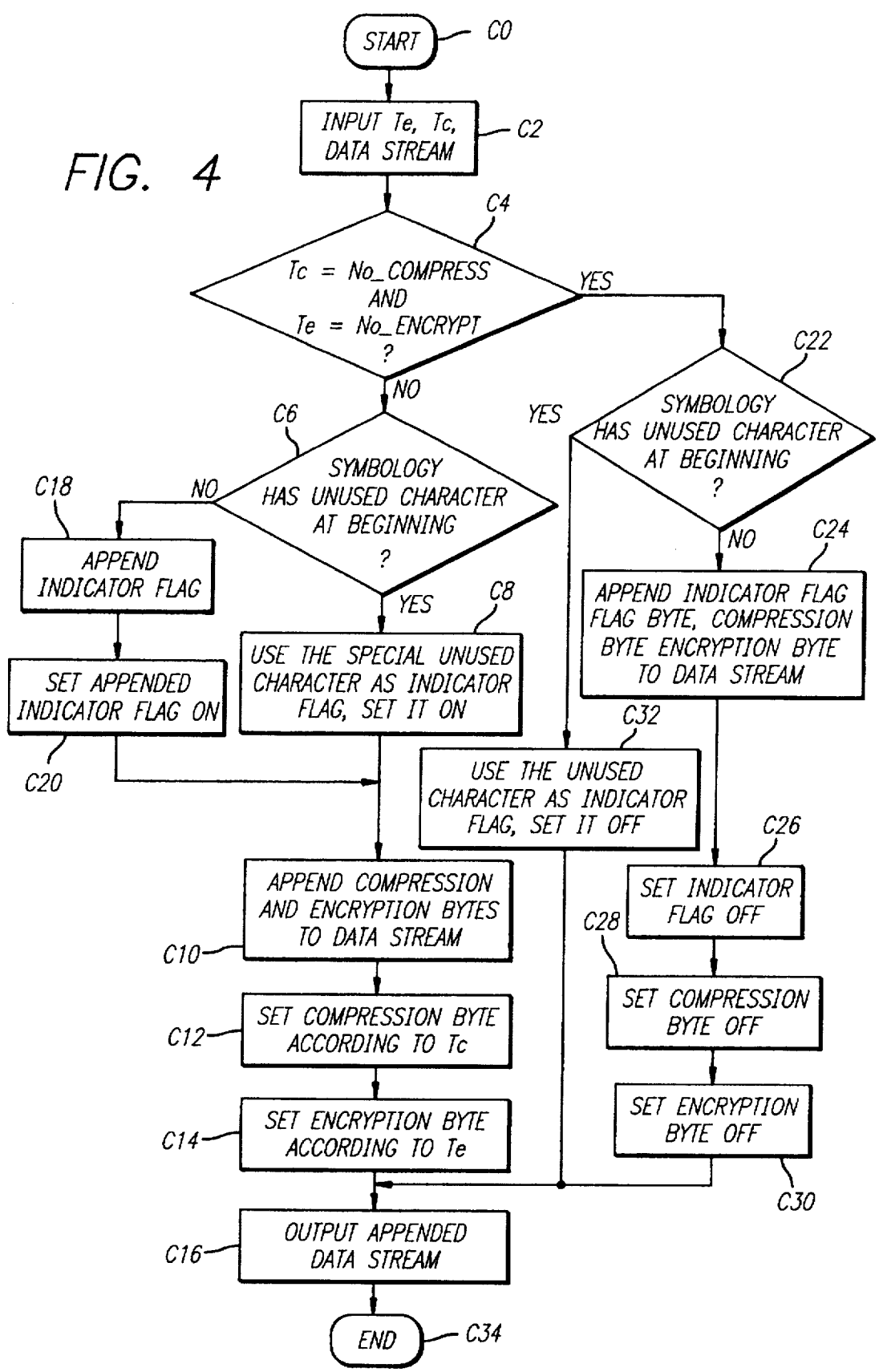
FIG. 4 illustrates the operation of the input control.

As shown in FIG. 4, the input control 14 receives the source data, which may have been compressed and/or encrypted, and $T_c$, and $T_e$ from the source coding control 12. The input control 14 examines $T_c$ and $T_e$ to determine whether the source data has been encrypted and/or compressed at step C4. If the source data has not been encrypted or compressed, the input control 14 determines whether the symbology chosen to encode the data will produce encoded data that contains an unused character at step C22. In order to determine whether the encoded data will have an unused character, the input control 14 must know which type of symbology will be used to encode the data. As set forth more fully below in describing the operation of the data encoder 16, many, conventional symbologies generate prefixes that contain unused characters. If the source data is encoded using such a symbology, the prefix in the encoded data will contain unused characters. If the encoded data contains an unused character, the input control 14 uses the unused character as a data flag and sets the unused character to indicate that there are no appended compression or encryption data at step C32. The input control 14 then outputs the source data at step C16.

If the chosen symbology will not produce encoded data that has an unused character, the input control 14 appends a flag, compression data, and encryption data to the encoded at step C24. The input control 14 then sets the appended flag to indicate the presence of compression and encryption data at step C26, sets the appended compression data to indicate that the source data was not compressed at step C28, and sets the appended encryption data to indicate that the source data was not encrypted at step C30. The input control 14 then outputs the source data at step C16.

If the source data is compressed and/or encrypted, the input control 14 determines whether the chosen symbology will create encoded data that contains an unused character at step C6. As explained above, the input control 14 makes this determination by knowing the type of symbology that will be used to encode the source data. If so, the input control 14 uses the unused character as the flag by setting it to indicate the presence of compression and/or encryption data at step C8. If the chosen symbology does not produce encoded data that contains an unused character, the input control 14 appends a flag to the encoded data and sets it to indicate the presence of compression and/or encryption data at steps C18 and C20. The input control 14 then appends to the encoded data compression data and encryption data at step C10; sets the compression data according to $T_c$ at step C12; sets the encryption data according to $T_e$ at step C14; and outputs the data at step C16.

The data encoder 16 receives the source data, which may have been compressed and/or encrypted, and encodes the source data. The data encoder 16 encodes the source data and thereby changes it such that it represents the symbols in a given coded symbol symbology. As explained above, symbology refers to the rules that define the way data is encoded into a printed pattern. Any suitable symbology may be chosen for use with the present invention.

Encoders for conventional symbologies create, in addition to encoded data, a prefix attached to the encoded data. The prefix defines one or more characteristics of the data. Some symbologies create a prefix that contains unused data characters. As was explained above, the input control 14 uses such unused data characters as a flag to indicate the presence or absence of appended compression and/or encryption data in the encoded data.

Figure 7A:
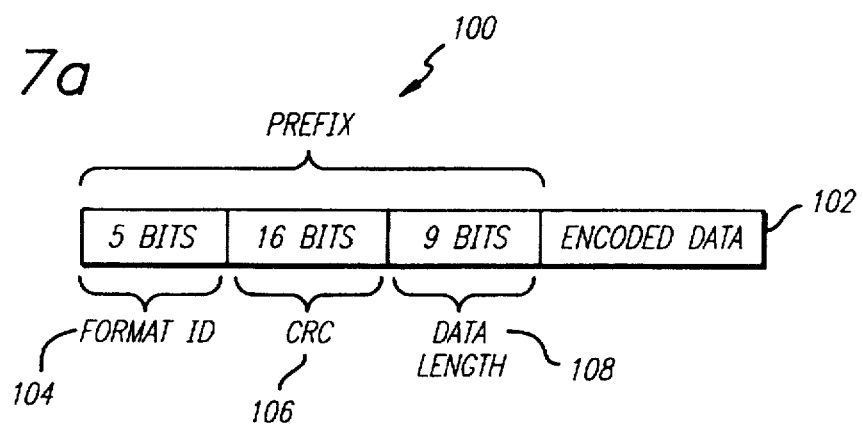
FIGS. 7a and 7b illustrate use of an unused character as a flag in an encoded data stream produced using a data matrix symbology encoder.
Figure 7B:
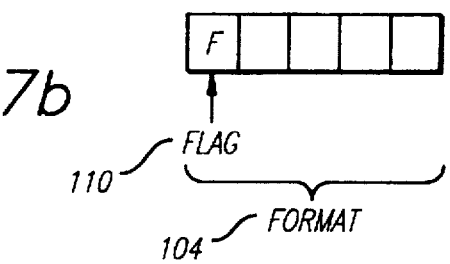
Figure 6D:
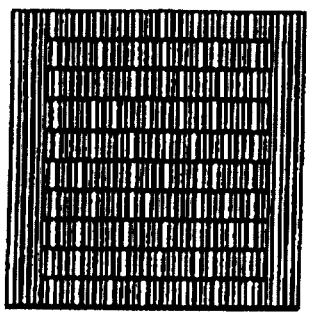
Figure 6E:
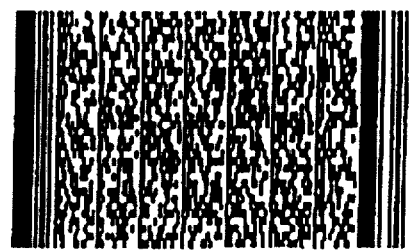
Figure 6F:
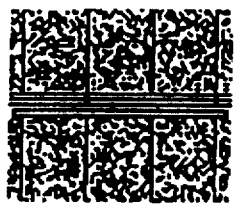
Figure 6G:
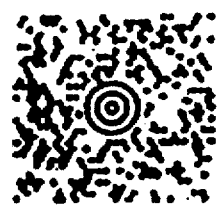
Figure 6H:
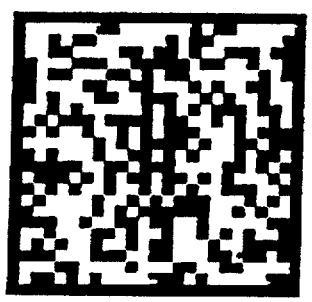
Figure 6I:
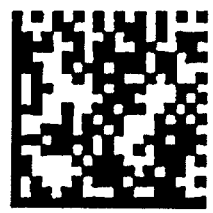

For example, FIG. 7a shows encoded data created using a Data Matrix (ECC000 to ECC140) encoder. The encoded data includes a prefix 100. The prefix includes five bits defining the format of the encoded data 104, sixteen bits defining cyclical redundancy check (CRC) data used for error checking 106, and nine bits defining the length of the encoded data 108. Because Data Matrix encoders can create only six different data formats, only three bits are needed to define the format 104. Consequently, the first two bits of the format data 104 are never used and therefore are unused data characters. As shown in FIG. 7b, the input control 14 uses one of the unused bits as the flag 110.

The encoded data produced by Data Matrix ECC200, Code One, and Maxicode encoders have an unused value in the first word of the encoded data. The encoded data produced by a PDF417 encoder has an unused value in the second word of the encoded data.

The printer 18 prints the pattern generated by the data encoder 16. Such printers are well known in the art. Any suitable printer may be chosen for use with the present invention.

The code reader 34 reads the coded symbol pattern printed by the printer 18. Conventional code readers employ electro-optical techniques to read the printed symbol pattern. Such code readers are well known in the art, and any suitable code reader may be chosen for use in the present invention. For example, the code reader may comprise a light source (not shown) that is used to illuminate the symbol pattern. Light reflected off of the pattern is received by a photodetector (not shown) or an equivalent device, which generates electric currents that are proportional to the amount of light reflected from the pattern. When the entire area of the pattern is scanned, the code reader uses the generated electric currents to create a data stream that comprises data representing the pattern.

The data decoder element 28 decodes the data stream and translates it into the original data. The same symbology used by the data encoder 16 to encode the printed pattern must be used to decode the printed patter. As stated above, numerous symbologies exist which are well known in the art. Any suitable symbology may be chosen for use with the present invention.

The interface control 26 determines whether the data read by the data stream is compressed and/or encrypted, and if so, determines the type of compression and/or encryption. As set forth above in describing the input control 14, the encoded data stream may contain appended information indicating whether the data is compressed and/or encrypted. The appended information can include a flag, compression data, and encryption data. The flag indicates the presence or absence of appended compression data and/or encryption data. The compression data indicates the type of compression used to compress the data stream, and the encryption data indicates the type of encryption used to encrypt the data stream. The operation of the interface control 26 is shown in FIG. 5.

As shown in FIG. 5, the interface control 26 first reads the flag in the data stream at steps D2, D4, D16. As set forth above in describing the operation of the input control 14, the flag may be an unused character in the data stream or data that was appended to the data stream by the input control 14. The interface control 26 then determines whether the flag indicates the presence or absence of appended compression and encryption data at step D6.

If the data stream contains appended compression and encryption data, the interface control 26 reads the compression type and encryption type and sets a compression indicator $T_c$ to indicate the compression type and an encryption indicator $T_e$ to indicate the encryption type at steps D8, D10. The interface control 26 then removes all the appended information from the data stream at step D12, and outputs the data stream, the encryption indicator $T_e$, and the compression indicator $T_c$ at step D14. If the data stream does not contain appended compression and encryption data, the interface control 26 removes any information that has been appended to the data stream at steps D18, D12, and outputs the data stream, the encryption indicator $T_e$, and the compression indicator $T_c$ at step D14.

The source decoding control 24 decompresses and/or decrypts the data stream. The operation of the source decoding control 24 is shown in FIG. 3. The source decoding control 24 first determines whether the compression indicator $T_c$ indicates that the data stream is compressed, and if so, the type of compression at step B4. If the data stream is compressed, the source decoding control 24 decompresses the data stream at step B6 in accordance with the compression indicator $T_c$. The source decoding control 24 then determines whether the encryption indicator $T_e$ indicates that the data stream is encrypted, and if so, the type of encryption at step B8. If the data stream is encrypted, the source decoding control 24 decrypts the data stream at step B10 in accordance with $T_e$. The source decoding control then outputs the decompressed and/or decrypted data stream at step B12.

The display device 20 displays the decoded data stream. Display devices are well known in the art. Any suitable display device can be chosen for use with the invention.

Having thus described a preferred embodiment of the invention, it should be apparent to those skilled in the art that certain advantages have been achieved. It should also be appreciated that various modifications, adaptations, and alternative embodiments thereof may be made within the scope and spirit of the present invention. The invention is further defined by the following claims.

What is claimed is:

1. A system for encoding source data comprising:

data compressor means for compressing said source data;

source coding control means coupled to said data compressor means for computing a size of said source data and a size of said compressed data, comparing the size of said source data to the size of said compressed data, and outputting output data, wherein said output data comprises said compressed data if the size of said source data exceeds the size of said compressed data by a given threshold, and said output data comprises said source data if the size of said source data does not exceed the size of said compressed data by the given threshold; and encoder means coupled to said data compressor means for encoding said output data according to a coded symbol symbology.

2. The system of claim 1 further including input control means coupled to said encoder means for appending data to said encoded output data.

3. The system of claim 2 wherein said input control means further comprises means for setting a flag in said encoded output data, said flag indicating that said appended data was appended to said encoded output data.

4. The system of claim 3 wherein said input control means further comprises means for determining whether said encoded output data includes unused data, and wherein if said encoded output data includes unused data, said unused data comprises said flag, and if said encoded output data does not include unused data, said appended data comprises said flag.

5. The system of claim 2 wherein said appended data comprises a compression type indicator.

6. The system of claim 2 further comprising data encryptor means coupled to said data compressor means for encrypting said source data.

7. The system of claim 6 wherein said appended data comprises an encryption type indicator.

8. A system for encoding source data into the form of a one or two dimensional bar code symbology, said symbology having a predefined structure, said system comprising:

data encryptor means for encrypting said source data;

encoder means coupled to said data encryptor means for encoding said encrypted data according to said bar code symbology; and input control means coupled to said encoder means for appending data to said encoded data within an unused portion of said predefined structure, said appended data comprising an encryption type indicator.

9. The system of claim 8 wherein said input control means further comprises means for setting a flag in said encoded data, said flag indicating that said appended data was appended to said encoded output data.

10. A system for encoding source data comprising:

data encryptor means for encrypting said source data;

encoder means coupled to said data encryptor means for encoding said encrypted data according to a coded symbol symbology; and input control means coupled to said encoder means for appending data to said encoded data, said appended data comprising an encryption type indicator;

wherein said input control means further comprises means for setting a flag in said encoded data, said flag indicating that said appended data was appended to said encoded output data, and means for determining whether said encoded data includes unused data, and wherein if said encoded data includes unused data, said unused data comprises said flag, and if said encoded data does not include unused data, said appended data comprises said flag.

11. A system for decoding data representing a coded symbol pattern according to a predetermined symbology, said system comprising:

reader means for reading a coded symbol and producing encoded data representing said coded symbol, said encoded data comprising compression data, decoder means coupled to said reader means for decoding said encoded data, and source decoding control means coupled to said decoder means for decompressing said decoded data in accordance with said compression data, wherein said compression data comprises a compression type indicator included within an unused portion of said predetermined symbology.

12. A system for decoding data representing a coded symbol pattern according to a predetermined symbology, said system comprising:

reader means for reading a coded symbol and producing encoded data representing said coded symbol, said encoded data comprising compression data, decoder means coupled to said reader means for decoding said encoded data, and source decoding control means coupled to said decoder means for decompressing said decoded data in accordance with said compression data, wherein said compression data comprises a flag included within an unused portion of said predetermined symbology, indicating whether said compression data further comprises a compression type indicator.

13. A system for decoding data representing a coded symbol pattern according to a predetermined symbology, said system comprising:

reader means for reading a coded symbol and producing encoded data representing said coded symbol, said encoded data comprising compression data included within an unused portion of said predetermined symbology, decoder means coupled to said reader means for decoding said encoded data, source decoding control means coupled to said decoder means for decompressing said decoded data in accordance with said compression data, and an interface control coupled to said decoder means for removing said compression data from said encoded data.

14. A system for decoding data representing a coded symbol pattern according to a predetermined symbology, said system comprising:

reader means for reading a coded symbol and producing encoded data representing said coded symbol, said encoded data comprising compression data included within an unused portion of said predetermined symbology, decoder means coupled to said reader means for decoding said encoded data, and source decoding control means coupled to said decoder means for decompressing said decoded data in accordance with said compression data, wherein said encoded data further comprises an encryption type indicator, and said source decoding control means further includes means for decrypting said decoded data stream in accordance with said encryption type indicator.

15. A system for decoding data representing a coded symbol pattern according to a predetermined symbology, said system comprising:

reader means for reading a coded symbol and producing encoded data representing said coded symbol, said encoded data comprising encryption data included within an unused portion of said predetermined symbology, decoder means coupled to said reader means for decoding said encoded data, and source decoding control means coupled to said decoder means for decrypting said decoded data in accordance with said encryption data, wherein said encryption data comprises an encryption type indicator.

16. A system for decoding data representing a coded symbol pattern according to a predetermined symbology, said system comprising:

reader means for reading a coded symbol and producing encoded data representing said coded symbol, said encoded data comprising encryption data included within an unused portion of said predetermined symbology, decoder means coupled to said reader means for decoding said encoded data, and source decoding control means coupled to said decoder means for decrypting said decoded data in accordance with said encryption data, wherein said encryption data comprises a flag indicating whether said encryption data further comprises an encryption type indicator.

17. A system for decoding data represented in the form of a one or two-dimensional bar code symbology, said symbology having a predefined structure, said system comprising:

reader means for reading a bar code symbol and producing encoded data representing said bar code symbol, said encoded data comprising encryption data included within an unused portion of said bar code symbology, decoder means coupled to said reader means for decoding said encoded data, source decoding control means coupled to said decoder means for decrypting said decoded data in accordance with said encryption data, and an interface control coupled to said decoder means for removing said encryption data from said encoded data.

18. A system for encoding and decoding source data comprising:

data compressor means for compressing said source data;

source coding control means coupled to said data compressor means for computing a size of said source data and a size of said compressed data, comparing the size of said source data to the size of said compressed data, and outputting output data, said output data comprising said compressed data if the size of said source data exceeds the size of said compressed data by a given threshold, said output data comprising said source data if the size of said source data does not exceed the size of said compressed data by the given threshold; and encoder means coupled to said source coding control for encoding said output data according to a coded symbol symbology, decoder means for receiving and decoding said encoded data; and source decoding control means coupled to said decoder means for decompressing said decoded data in accordance with said compression data.

19. A method for encoding source data comprising the steps of:

compressing said source data;

computing a size of said source data and a size of said compressed data;

comparing the size of said source data to the size of said compressed data;

outputting output data, wherein said output data comprises said compressed data if the size of said source data exceeds the size of said compressed data by a given threshold, and said output data comprises said source data if the size of said source data does not exceed the size of said compressed data by the given threshold; and encoding said output data according to a coded symbol symbology.

20. The method of claim 19 further comprising the step of appending data to said encoded output data, said appended data comprising a compression type indicator.

21. The method of claim 20 further comprising the step of setting a flag in said encoded output data, said flag indicating that said appended data was appended to said encoded output data.

22. The method of claim 21 further comprising the step of determining whether said encoded output data includes unused data, and wherein if said encoded output data includes unused data, said unused data comprises said flag, and if said encoded output data does not include unused data, said appended data comprises said flag.

23. A method for encoding source data comprising the steps of:

encrypting said source data;

encoding said encrypted data according to a coded symbol symbology having a predefined structure; and appending data to said encoded data, said appended data comprising an encryption type indicator.

24. The method of claim 23 further comprising the step of setting a flag in said encoded data, said flag indicating that said appended data was appended to said encoded output data.

25. A method for encoding source data comprising the steps of:

encrypting said source data;

encoding said encrypted data according to a coded symbol symbology;

appending data to said encoded data, said appended data comprising an encryption type indicator;

setting a flag in said encoded data, said flag indicating that said appended data was appended to said encoded output data; and determining whether said encoded data includes unused data, and wherein if said encoded data includes unused data, said unused data comprises said flag, and if said encoded data does not include unused data, said appended data comprises said flag.

26. A method for decoding data representing a coded symbol pattern comprising the steps of:

reading a coded symbol encoded in a given symbology and producing encoded data representing said coded symbol, said encoded data comprising compression data included in an unused portion of said symbology, decoding said encoded data according to said given symbology, and decompressing said decoded data in accordance with said compression data, wherein said compression data comprises a compression type indicator.

27. The method of claim 26 wherein said compression data comprises a flag indicating whether said compression data further comprises a compression type indicator.

28. The method of claim 27 further comprising the step of removing said compression data from said encoded data.

29. A method for decoding data representing a coded symbol pattern comprising the steps of:

reading a coded symbol encoded in a given symbology and producing encoded data representing said coded symbol, said encoded data comprising encryption data included in an unused portion of said symbology, decoding said encoded data in accordance with said symbology, and decrypting said decoded data in accordance with said encryption data, wherein said encryption data comprises an encryption type indicator.

30. A method for decoding data representing a coded symbol pattern comprising the steps of:

reading a coded symbol encoded in a given symbology and producing encoded data representing said coded symbol, said encoded data comprising encryption data included within an unused portion of said symbology, decoding said encoded data in accordance with said symbology, and decrypting said decoded data in accordance with said encryption data, wherein said encryption data comprises a flag indicating whether said encryption data further comprises an encryption type indicator.

31. A method for decoding data representing a coded symbol pattern comprising the steps of:

reading a coded symbol encoded in a given symbology and producing encoded data representing said coded symbol, said encoded data comprising encryption data included within an unused portion of said symbology, decoding said encoded data in accordance with said symbology, decrypting said decoded data in accordance with said encryption data, and removing said encryption data from said encoded data.

* * * * *